US011538189B1

(12) United States Patent
Sztuk et al.

(10) Patent No.: US 11,538,189 B1
(45) Date of Patent: Dec. 27, 2022

(54) CASE FOR HEAD-MOUNTED DEVICE

(71) Applicant: Meta Platforms Technologies, LLC, Menlo Park, CA (US)

(72) Inventors: Sebastian Sztuk, Menlo Park, CA (US); Tony David, San Jose, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 16/950,555

(22) Filed: Nov. 17, 2020

(51) Int. Cl.
| | |
|---|---|
| *G06T 7/80* | (2017.01) |
| *A45C 11/04* | (2006.01) |
| *G02B 27/01* | (2006.01) |
| *H04W 4/30* | (2018.01) |
| *H02J 7/00* | (2006.01) |
| *H01M 10/46* | (2006.01) |
| *H04N 13/246* | (2018.01) |
| *G03B 43/00* | (2021.01) |

(52) U.S. Cl.
CPC ............... *G06T 7/80* (2017.01); *A45C 11/04* (2013.01); *G02B 27/0172* (2013.01); *G03B 43/00* (2013.01); *H01M 10/46* (2013.01); *H02J 7/0044* (2013.01); *H04N 13/246* (2018.05); *H04W 4/30* (2018.02); *G02B 2027/014* (2013.01); *G02B 2027/0138* (2013.01); *G02B 2027/0178* (2013.01)

(58) Field of Classification Search
CPC ....... G06T 7/80; A45C 11/04; G02B 27/0172; G02B 2027/014; G02B 2027/0178; H02J 7/0044; H04W 4/30
See application file for complete search history.

(56) References Cited

U.S. PATENT DOCUMENTS

| | | | | |
|---|---|---|---|---|
| 9,482,882 | B1* | 11/2016 | Hanover | ............ H01R 13/6205 |
| 2007/0281752 | A1 | 12/2007 | Lewis | |
| 2017/0237908 | A1* | 8/2017 | Ko | .......................... H04N 5/247 |
| | | | | 386/341 |
| 2018/0131847 | A1* | 5/2018 | Kokonaski | .............. H02J 50/10 |
| 2019/0272800 | A1* | 9/2019 | Tao | ........................ G09G 5/006 |
| 2019/0387958 | A1* | 12/2019 | Kimpe | .................... A61B 5/444 |
| 2020/0179787 | A1* | 6/2020 | Swan | .................. G02B 27/0176 |
| 2020/0251929 | A1* | 8/2020 | Partovi | ................... H02J 50/12 |

* cited by examiner

*Primary Examiner* — Frank F Huang
(74) *Attorney, Agent, or Firm* — Freestone Intellectual Property Law PLLC; Aaron J. Visbeek; William J. Pigott

(57) ABSTRACT

A case for a head-mounted device includes a body portion and a power supply. The body portion includes one or more walls defining an interior cavity that is configured to receive and house the head-mounted device. The power supply is included in the body portion for transferring power to the head-mounted device.

20 Claims, 8 Drawing Sheets

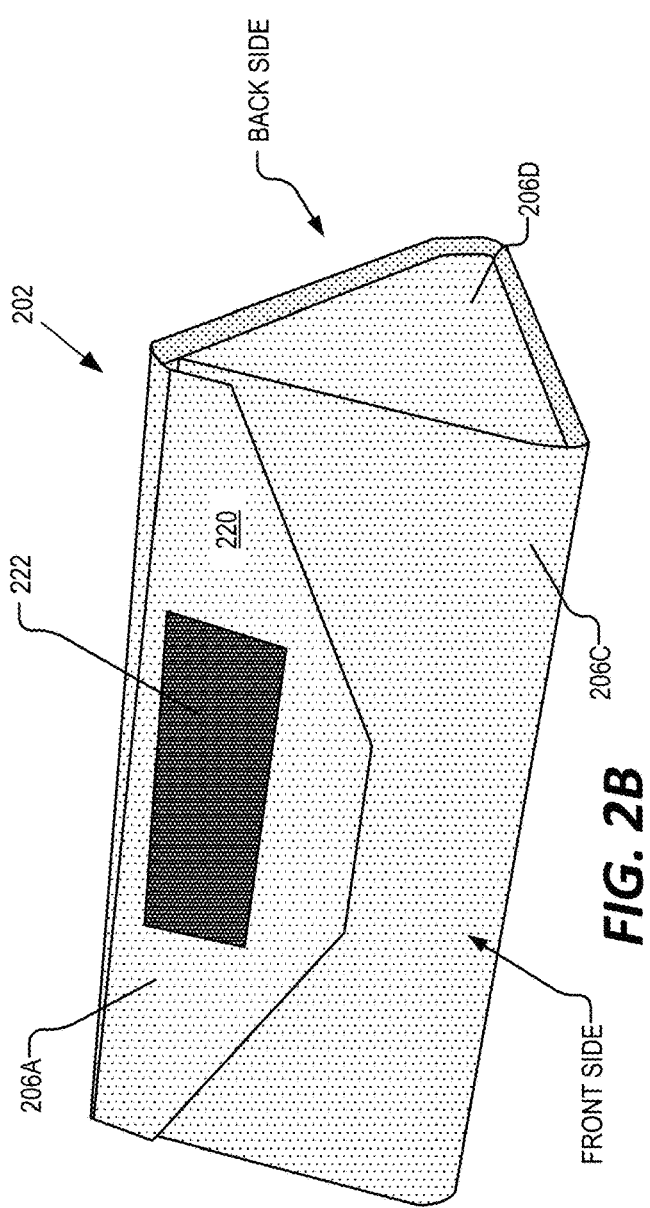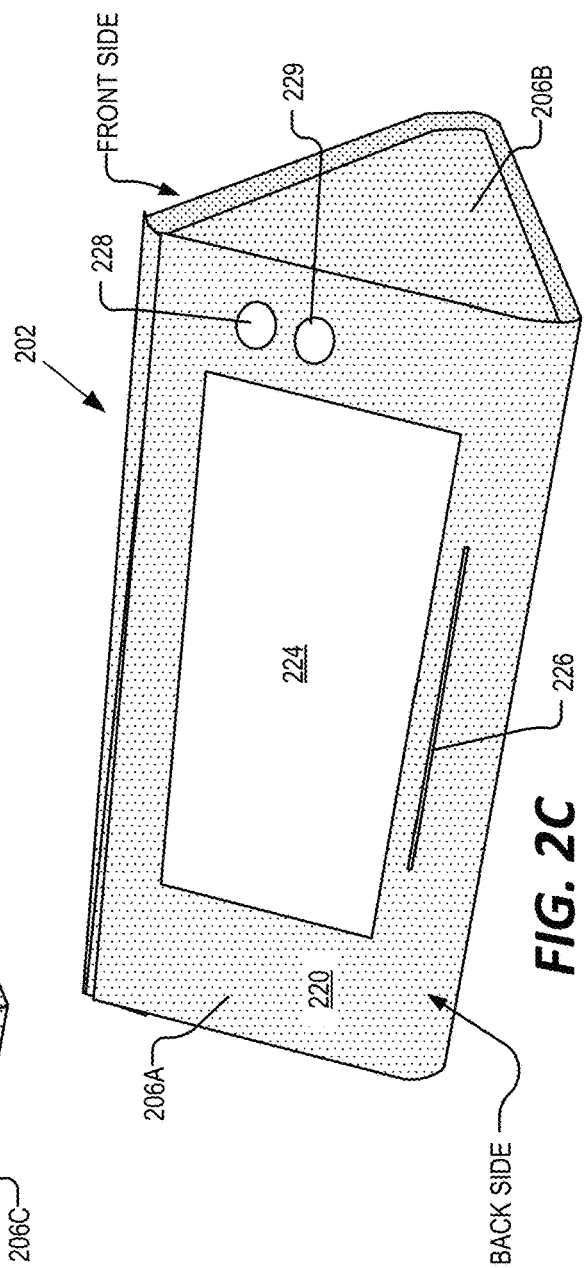

CASE FOR HEAD-MOUNTED DEVICE

BACKGROUND INFORMATION

A head-mounted device is an electronic device that typically communicates with other devices or networks. In some situations the head-mounted device is a wearable device that is configured to operate interactively with a user. A head-mounted device may be designed to support a variety of form factors, such as Augmented Reality (AR) glasses, Virtual Reality (VR) glasses, or activity tracking/personal assistant glasses, content creation glasses, audio glasses just to name a few.

Head-mounted devices may include one or more electronic components for use in a variety of applications, such as gaming, aviation, engineering, medicine, entertainment, video/audio chat, activity tracking, and so on. However, due to the compact form factor often associated with head-mounted devices, the head-mounted device may include limited resources, such as limited processing power, limited memory, limited battery life, limited wireless bandwidth, etc.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 2B, 2C, and 2D illustrate various views of the case of FIG. 2A.

DETAILED DESCRIPTION

Embodiments of a portable case for a head-mounted device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
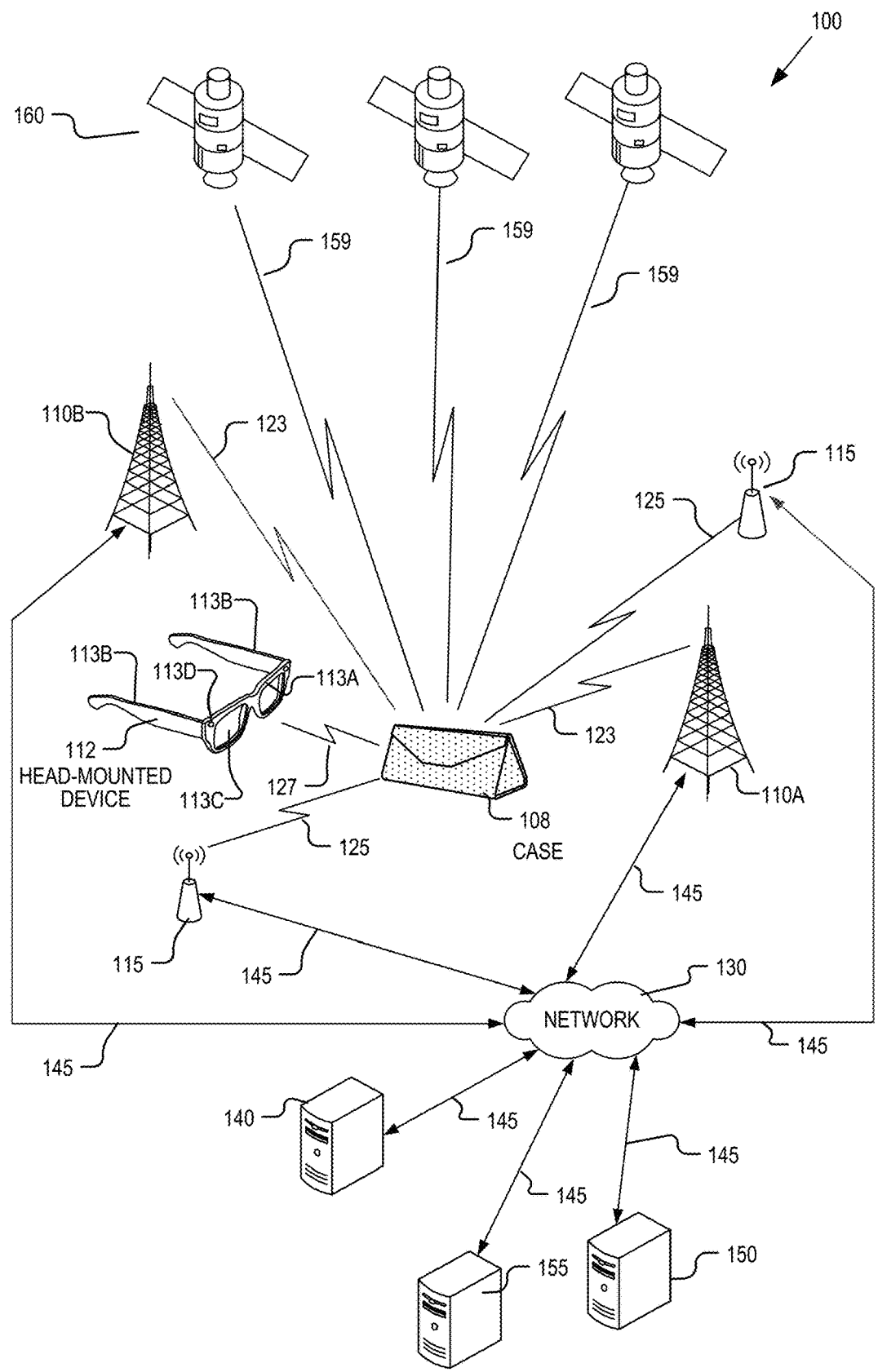
FIG. 1 illustrates an example operating environment for a head-mounted device and a case, in accordance with aspects of the present disclosure.

According to one aspect of the disclosure, FIG. 1 illustrates an example operating environment 100 for a case 108 that is configured as a portable carrying case for a head-mounted device 112. In some examples, head-mounted device 112 is configured to be worn on the head of a user. The head-mounted device 112 may be activity tracking/personal assistant glasses that may include one or more cameras to capture video or photos, and audio of the environment. In other examples, the head-mounted device 112 may be configured to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

In the illustrated example, head-mounted device 112 is shown as including a frame 113A, temple arms 113B, near-eye optical elements 113C, and cameras 113D. Cameras 113D are shown as coupled to frame 113A. In some examples, the near-eye optical element 113C may include one or more optical components, such as a polarizer, a waveguide, reflector, a waveplate, a lens (e.g., prescription lens), one or more in-field illumination sources, a diffractive optical element, a display layer, and so on.

As shown in FIG. 1, frame 113A is coupled to temple arms 113B for securing the head-mounted device 112 to the head of a user. Example head-mounted device 112 may also include supporting hardware incorporated into the frame 113A and/or temple arms 113B. The hardware of head-mounted device 112 may include any of processing logic, wired and/or wireless data interfaces for sending and receiving data, graphic processors, and one or more memories for storing data and computer-executable instructions, speakers and microphones. In one example, head-mounted device 112 may be configured to receive wired power and/or may be configured to be powered by one or more batteries. In addition, head-mounted device 112 may be configured to receive wired and/or wireless data including video data.

FIG. 1 illustrates near-eye optical elements 113C that are mounted to the frame 113A. In some examples, near-eye optical elements 113C may appear transparent to the user to facilitate augmented reality or mixed reality such that the user can view visible scene light from the environment while also receiving display light directed to their eye(s) by way of a display layer. In further examples, the transparent nature of some or all of the near-eye optical elements 113C allows the user to view an electronic display (e.g., a liquid crystal display (LCD), an organic light emitting diode (OLED) display, a micro-LED display, etc.) that may be incorporated in the head-mounted device 112.

The display layer of the near-eye optical elements 113C may include one or more other optical elements depending on the design of the head-mounted device 112. For example, the display layer may include a waveguide to direct display light generated by an electronic display to the eye of the user. In some implementations, at least a portion of the electronic display is included in the frame 113A of the head-mounted device 112. The electronic display may include an LCD, an organic light emitting diode (OLED) display, micro-LED display, pico-projector, or liquid crystal on silicon (LCOS) display for generating the display light. The in-field light sources, if included in near-eye optical element 113C, may be configured to emit non-visible light to illuminate the eye of a user for eye-tracking purposes.

FIG. 1 also illustrates a case 108 as operating in the environment 100. One function of case 108 is to house and protect the head-mounted device 112 when the head-mounted device 112 is not being worn by a user. For example, the case 108 may include an interior cavity within which the head-mounted device 112 may be placed to protect the head-mounted device 112 from dirt, scratches, or other damage. In addition, case 108 may be configured to supplement, expand, and/or support many of the functions provided by the head-mounted device 112, itself. For example, as discussed above, due to its compact form factor, head-mounted device 112 may include limited resources, such as limited battery life. Thus, in some examples, case 108 may include a power supply for charging head-mounted device 112 while head-mounted device 112 is connected to the case 108. Such a feature may extend the operational time of the head-mounted device 112 by allowing the on-board batteries of the head-mounted device 112 to be recharged while being stored in the case 108, and thus reduce the number of occurrences where head-mounted device 112 may need to be charged via a typical wall charger, or become the primary method of charging.

In addition, case 108 may be configured to provide additional features for supporting the operation of head-mounted device 112, such as providing additional memory storage, processing, photo/video management, wireless bandwidth, antenna signal efficiency, 5G data link, calibration, etc. These and other features will be described in more detail below.

Returning now to FIG. 1, in certain implementations, case 108 may be configured to transmit radio signals to, and receive radio signals from, one or more wireless communication networks. In one example, case 108 may communicate with a cellular communication network by transmitting wireless signals to, or receiving wireless signals from, a base station transceiver 110A over a wireless communication link 123. Such cellular communication networks may include, but are not limited to, standards in accordance with GSM, CMDA, 2G, 3G, 4G, LTE, 5G, etc. It should be understood that the digital cellular network may include additional base stations or other resources that may not be shown in FIG. 1.

Similarly, case 108 may transmit wireless signals to, or receive wireless signals from a local transceiver 115 over a wireless communication link 125. In some implementations, local transceiver 115 may be configured to communicate with case 108 at a shorter range over wireless communication link 125 than at a range enabled by base station transceiver 110A over wireless communication link 123. For example, local transceiver 115 may be positioned in an indoor environment. Local transceiver 115 may provide access to a wireless local area network (WLAN, e.g., IEEE Std. 802.11 network). In another example implementation, local transceiver 115 may be a femto cell transceiver capable of facilitating communication on link 125 according to a cellular communication protocol. Of course it should be understood that these are merely examples of networks that may communicate with case 108 over a wireless link, and claimed subject matter is not limited in this respect.

In some implementations, base station transceivers 110A and 110B, as well as local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between case 108 and servers 140, 150 or 155 through local transceiver 115 or base station transceiver 110A. In another implementation, network 130 may comprise cellular communication network infrastructure such as, for example, a base station controller or master switching center (not shown) to facilitate mobile cellular communication with case 108.

In some aspects, case 108 may receive or acquire satellite positioning system (SPS) signals 159 from SPS satellites 160. In some examples, SPS satellites 160 may be from a global navigation satellite system (GNSS), such as the GPS or Galileo satellite systems. In other examples, the SPS Satellites may be from multiple GNSS' such as, but not limited to, GPS, Galileo, Glonass, or Beidou (Compass) satellite systems. In other examples, SPS satellites may be from any one of several regional navigation satellite systems (RNSS) such as, for example, Wide Area Augmentation System (WAAS), European Geostationary Navigation Overlay Service (EGNOS), Quasi-Zenith Satellite System (QZSS), just to name a few examples.

Furthermore, in one embodiment, case 108 may be configured to establish a communication link 127 with head-mounted device 112 through one or more communication interfaces (e.g., a Bluetooth interface, an RF antenna, a wired connection, etc.) that enable the case 108 to send and receive data with the head-mounted device 112. Furthermore, an application program interface (API) that supports communication between the case 108 and head-mounted device 112 may enable the transfer of such data. In some implementations, case 108 may be configured to communicate with head-mounted device 112 at a shorter range over communication link 127 than at a range enabled by local transceiver 115 over wireless communication link 125. For example, communication link 127 may be a wireless personal area network (WPAN), such as IrDA, Wireless USB, Bluetooth, or ZigBee. Thus, in some implementations, the only communications link established by the head-mounted device 112 may be communication link 127 with the case 108. In this example, communication link 127 between the case 108 and the head-mounted device 112 may be established to omit the need for a phone or tablet for communication between head-mounted device 112 and network 130. Instead, case 108 may be configured as a hub for the transfer of content from network 130 to the head-mounted device 112 and/or for the transfer of content from the head-mounted device 112 to network 130.

Figure 2A:
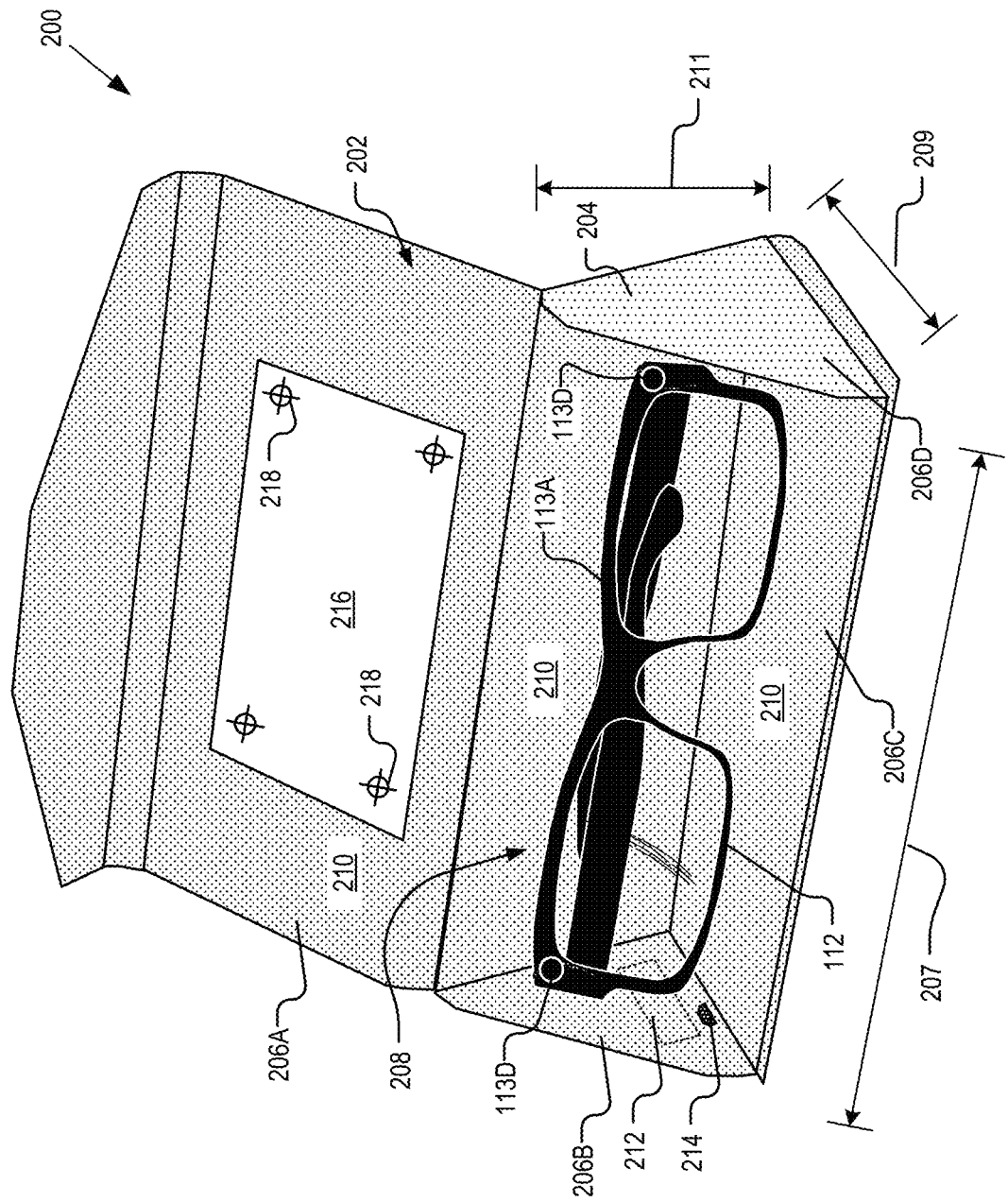
FIG. 2A illustrates an example system that includes a head-mounted device and a case, in accordance with aspects of the present disclosure.

FIG. 2A illustrates an example system 200 that includes head-mounted device 112 and a case 202, in accordance with aspects of the present disclosure. Case 202 is one possible implementation of case 108 of FIG. 1. The illustrated example of case 202 is shown as including a body portion 204 that comprises walls 206A-206D. The walls 206A-206D are configured to define an interior cavity 208. As shown in FIG. 2A, the interior cavity 208 is configured to receive and house the head-mounted device 112. In some aspects, the interior cavity 208 is sized to accommodate the size and shape of the head-mounted device 112. For example, the interior cavity 208 is shown as including a width 207, a depth 209, and a height 211. In some examples, width 207 is in the range of 120 mm to 220 mm, depth 209 is in the range of 60 mm to 90 mm, and height 211 is in the range of 40 mm to 80 mm Although FIG. 2A illustrates the body portion 204 as including four walls 206A-206D, body portion 204 may include any number of walls including one or more to define the interior cavity 208. In some examples, body portion 204 and walls 206A-206D are formed from a rigid or semi-rigid material, such as plastic. In addition, one or more of the interior surfaces 210 of the walls 206A-206D may be lined with a soft, non-abrasive material, such as microfiber, fabric or suede, to protect and prevent scratches to the frame 113A and/or near-eye optical elements of head-mounted device 112.

In some aspects, the body portion 204 includes a power supply 212. The power supply 212 may be incorporated within or attached to at least one of the walls 206A-206D (e.g., FIG. 2A illustrates power supply 212 incorporated into wall 206B). Also shown in FIG. 2A is an electrical connector 214. In some aspects, electrical connector 214 is coupled to the power supply 212 and is configured to electrically connect the power supply 212 to the head-mounted device 112 for transferring power to the head-mounted device 112. In some examples, electrical connector 214 is a USB, micro-USB, mini-USB, or other receptacle for mating with a corresponding plug of a cable that is to be connected to head-mounted device 112. In another example, electrical connector 214 is a dongle or cable that protrudes from the wall 206B into the interior cavity 208 to connect with the head-mounted device 112 without the need for an extra cable. In some examples, electrical connector 214 includes one or more pogo or other spring-loaded pins for directly mating with the head-mounted device 112. Accordingly, during operation, head-mounted device 112 may be placed within interior cavity 208 and then connected to electrical connector 214 to charge the internal batteries of the head-mounted device 112. In yet another example, electrical connector 214 includes, or is connected to, an inductive charging plate for the wireless charging of the head-mounted device 112. In this example, the inductive charging of the head-mounted device 112 by case 108 may be accomplished in accordance with one or more wireless charging standards, such as provided by the Qi specification. Note that other wireless charging platforms are also possible and may be supported by case 108, such as wireless charging completed through radio frequency (RF) signals (and the like). In some examples, the power supply 212 may include additional circuitry, such as an over-current protection circuit, temperature sensitive charging control logic, and so on. In addition to providing a mechanism for the transfer of power to head-mounted device 112, in some implementations, electrical connector 214 may also be utilized for establishing a wired communications link between the case 108 and the head-mounted device 112 (e.g., communications link 127).

In some examples, head-mounted device 112 includes one or more cameras 113D. The cameras 113D may be included in the frame 113A to capture images of the environment. The position of the cameras 113D may be fixed and at a known location with respect to one another and/or with respect to one or more other components of the head-mounted device 112. The images obtained by the cameras 113D, along with their known locations, may be utilized by the head-mounted device 112 in a variety of contexts, such with capturing stereoscopic images, determining a pose of the head-mounted device 112, rendering a virtual graphic for augmented reality, and so on. However, in some instances the cameras 113D may become out of alignment. For example, the frame 113A may warp or deform due to heat, humidity, damage, or other stresses placed on the frame 113A. Accordingly, in some aspects, the case 202 may include a calibration surface 216 used for the calibration of the cameras 113D of head-mounted device 112.

As shown in FIG. 2A, calibration surface 216 is disposed on wall 206A on the interior surface 210. The calibration surface 216 is positioned such that it will be facing the cameras 113D within the interior cavity 208, while the head-mounted device 112 is disposed within the interior cavity 208. In the particular example of FIG. 2A, wall 206A is a moveable lid, which when closed positions the calibration surface 216 in front of and facing cameras 113D. The cameras 113D are then configured to capture the calibration surface 216 and perform one or more image processing techniques to determine the current position of one or more of the cameras 113D. The determined position of the cameras 113D may then be utilized to calibrate subsequent image acquisition by the head-mounted device 112. In some examples, the calibration surface 216 includes one or more registration features 218 or other objects that are identifiable through the image processing techniques.

In some aspects, the calibration surface 216 is a label of a calibration image that is adhered to the interior surface 210. In another aspect, the calibration surface 216 is an image that is printed or etched directly on the interior surface 210 of wall 206A. Although the illustrated example of case 202 is shown as including a single calibration surface 216 disposed on the interior surface 210 of wall 206A, in other implementations, case 202 may include any number of calibration surfaces disposed one or more of the walls 206A, 206B, 206C, and/or 206D.

In a further example, calibration surface 216 may include one or more illumination sources that are provided to illuminate or provide a calibration image themselves. For example, the calibration surface 216 may include a backlight incorporated into the wall 206A to emit a calibration light. In another example, the illumination sources may include one or more light pipes, or light tubes, that are arranged on interior surface 210 to form a calibration image.

The calibration of the cameras 113D of head-mounted device 112 may involve one or more calibration processes that are triggered by the head-mounted device 112 being inserted into the case. For example, the calibration process may be triggered a predetermined delay after the head-mounted device 112 is placed within interior cavity 208. In one implementation, the case 202 may be configured to trigger the calibration process based on IMU data that indicates that the case 108 is stationary. In another implementation, exposure to dark environments measured by an ambient light sensor could be used to trigger the calibration process (e.g., indicating it is nighttime). In another example, the calibration process could also be manually triggered by the user via one or more user interfaces.

In some examples, the calibration process includes capturing images of the calibration surface 216 by the cameras 113D and then calculating calibration parameters based on the captured images. The calibration process may be performed by the head-mounted device 112, the case 202, servers 140, 150, 155, and/or any combination thereof.

In some implementations, the calibration surface 216 is configured and positioned on the interior surface 210 of wall 206A, such that both cameras 113D of the head-mounted device 112 have some overlapping field-of-view, where both cameras capture at least some of the same portion of the pattern (e.g., registration features 218) included in the calibration surface 216. In another implementation, each camera 113D may be calibrated separately, based on separate images captured by each camera that are then combined based on a predetermined knowledge of which portion of the calibration surface 216 that each camera captured. In some aspects, the registration features 218 may include markers or QR codes that identify the location and orientation of the calibration surface 216.

FIG. 2B illustrates a view of a front side of the case 202 when case 202 is closed. In some examples, when case 202 is closed, the head-mounted device 112 is completely enveloped by the walls 206A-D within the interior cavity 208.

FIG. 2B illustrates the example case 202 as including an optional array 222 of photovoltaic cells (e.g., solar panel) disposed on an exterior surface 220 of the wall 206A. The array 222 is configured to convert solar energy into electrical power that is then provided to the power supply 212 of FIG. 2A. The power collected by the array 222 may be utilized to charge the internal batteries of case 202 and/or to supplement the power provided to head-mounted device 112 by way of power supply 212.

FIG. 2C illustrates a view of a back side of the case 202 when case 202 is closed. In particular, FIG. 2C illustrates case 202 as including additional optional components, such as an electronic display 224, a speaker 226, one or more user input devices 228 (e.g., buttons), and a camera 229 that are disposed on the exterior surface 220 of wall 206A. Electronic display 224 may include an LED, OLED, or other display technology for displaying images and/or video, and a live stream of the camera feed. In some examples, electronic display 224 is a touchscreen for presenting images and for receiving user input via one or more touch gestures. The electronic display 224, speaker 226, user input devices 228, and/or camera 229 may be utilized to supplement one or more functions of the head-mounted device 112. For example, images and/or video captured by the head-mounted device 112 may be presented on the electronic display 224 for viewing by a user. Furthermore, user input may be received via the electronic display 224 and/or user input devices 228 to allow a user to edit, tag, or otherwise modify the images/video. Even still, camera 229 may be utilized by the case 202 to capture images of the user and/or environment, and may also be used in conjunction with electronic display 224 for a video-conferencing application.

In yet another aspect, the case 202 may be configured to operate as a remote control for the head-mounted device 112 while the head-mounted device 112 is in use (e.g., being worn by the user). For example, the user input devices 228 could be configured to trigger the head-mounted device 112 to capture an image/video (e.g., user presses the button to trigger the camera 113D of the head-mounted device 112 to capture an image). In another example, the case 202 may include a motion sensor to track movements, positions, and/or orientations of the case 202, itself, which may be utilized as user input by a game or other application executing on the head-mounted device 112. Even still, the case 202 may execute one or more native applications that augment the operation of the head-mounted device 112. For instance, the case 202 may execute a setup application to aid the user in setting up the head-mounted device 112 (e.g., electronic display 224 may present instructions and receive user input for configuring the head-mounted device 112 by setting user preferences, network settings, etc.). These and other features provided by the case 202 will be described in further detail below with reference to FIG. 3.

Figure 2D:
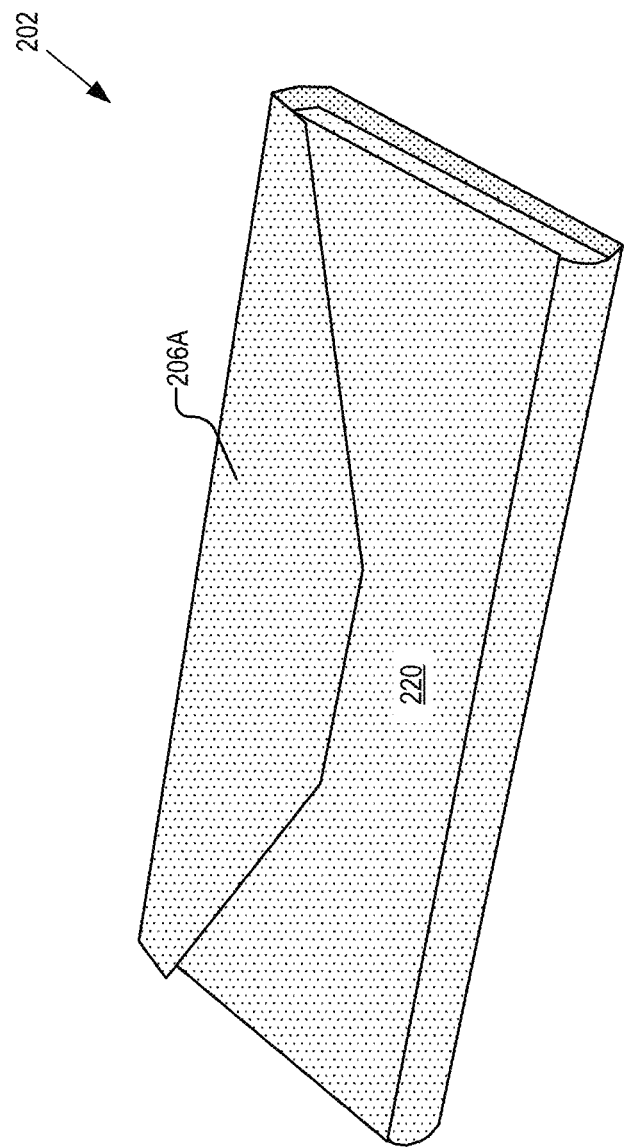

In some examples, one or more of the walls 206A-206D are foldable to reduce a profile of the case 202 while the head-mounted device 112 is not being stored within the case 202. For example, FIG. 2D illustrates a view of case 202 when folded.

Figure 3A:
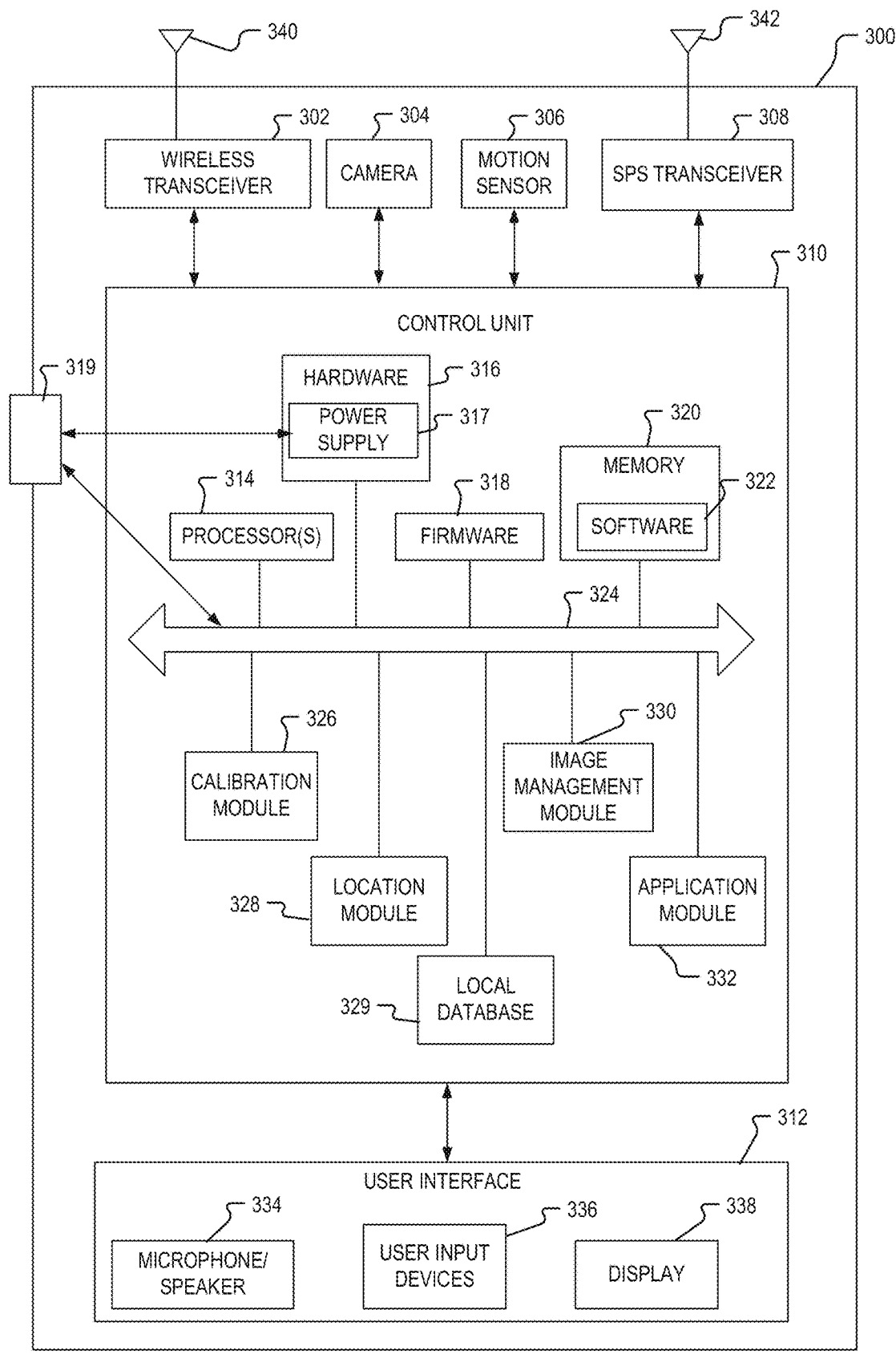
FIG. 3A illustrates an example block diagram of a case, in accordance with aspects of the present disclosure.

FIG. 3A illustrates an example block diagram of a case 300, in accordance with aspects of the present disclosure. Case 300 is one possible implementation of any of the cases discussed herein, including case 108 of FIG. 1 and case 202 of FIGS. 2A-2D. In some examples, one or more of the components of case 300 illustrated in FIG. 3A may be incorporated within, or attached to, one or more walls of a body portion of a case, such the walls 206A-206D.

The various features and functions illustrated in the diagram of FIG. 3A are connected together using a common data bus 324 which is meant to represent that these various features and functions are operatively coupled together. Those skilled in the art will recognize that other connections, mechanisms, features, functions, or the like, may be provided and adapted as necessary to operatively couple and configure an actual portable device. Further, it is also recognized that one or more of the features or functions illustrated in the example of FIG. 3A may be further subdivided or two or more of the features or functions illustrated in FIG. 3A may be combined.

The case 300 may include one or more wireless transceivers 302 that may be connected to one or more antennas 340. The wireless transceiver 302 may include suitable devices, hardware, and/or software for communicating with and/or detecting signals to/from base station transceivers 110A, 110B, local transceiver 115, head-mounted device 112 and/or directly with other wireless devices within a network. For example, the wireless transceiver 302 may comprise a CDMA communication system suitable for communicating with a CDMA network of wireless base stations; however in other aspects, the wireless communication system may comprise another type of cellular telephony network, such as, for example, TDMA, OFDMA or GSM. Additionally, any other type of wide area wireless networking technologies may be used, for example, WiMAX (IEEE 802.16), etc. The wireless transceiver 302 may also include one or more local area network (LAN) transceivers that may be connected to one or more antennas 340. For example, the wireless transceiver 302 may include suitable devices, hardware, and/or software for communicating with and/or detecting signals to/from base station transceivers 110A, 110B, and/or directly with other wireless devices within a network. In one aspect, the wireless transceiver 302 may include a Wi-Fi (802.11x) communication system suitable for communicating with one or more wireless access points; however in other aspects, the wireless transceiver 302 may comprise another type of local area network, personal area network, (e.g., Bluetooth). Additionally, any other type of wireless networking technologies may be used, for example, Ultra Wide Band, ZigBee, wireless USB, etc.

As shown in FIG. 3A, case 300 may optionally include a camera 304. Camera 304 may be a single monocular camera, a stereo camera, and/or an omnidirectional camera. In one aspect, camera 304 is calibrated such that the camera parameters (e.g., intrinsics and extrinsics; focal length, displacement of the optic center, radial distortion, tangential distortion, etc.) are known. Camera 304 is coupled to a control unit 310 to provide images to the control unit 310. In some examples, camera 304 is located on an exterior of the case 300, such that the camera 304 is facing a user. In this example, the camera 304 may be utilized to enable on-the-go video-conferences in conjunction with an electronic display (e.g., electronic display 224).

The illustrated example of case 300 also includes an optional motion sensor 306. Motion sensor 306 may be coupled to control unit 310 to provide movement and/or orientation information which is independent of motion data derived from signals received by the wireless transceiver 302 and a Satellite Positioning System (SPS) transceiver 308. In some implementations, the case 300 may be configured to function as a remote controller for use with the head-mounted device 112. For example, the motion sensor 306 may be configured to generate motion data that is representative of one or more movements of the case 300. The wireless transceiver 302 may then be configured to transmit the motion data to the head-mounted device 112 via a wireless communications link. A game or other application running on the head-mounted device 112 may then utilize the motion data as user input.

The SPS transceiver 308 may also be included in the case 300. The SPS transceiver 308 may be connected to one or more antennas 342 for receiving satellite signals. The SPS transceiver 308 may comprise any suitable hardware and/or software for acquiring, receiving, and processing SPS signals. The SPS transceiver 308 requests information and operations as appropriate from the other systems and performs the calculations necessary to determine the position of case 300 using measurements obtained by any suitable SPS algorithm. In one aspect, SPS transceiver 308 is coupled to control unit 310 to provide one or more SPS measurements to the control unit 310.

Case 300 also includes a control unit 310 that is connected to and communicates with the wireless transceiver 302, the camera 304, the motion sensor 306, the SPS transceiver 308, and user interface 312, if present. Control unit 310 may be provided by a processor 314 and associated memory 320, hardware 316, firmware 318, and software 322.

The processor 314 may include one or more microprocessors, microcontrollers, and/or digital signal processors that provide processing functions, as well as other calculation and control functionality. The processor 314 may also include memory 320 for storing data and software instructions for executing programmed functionality within the case 300. The memory 320 may be on-board the processor 314 (e.g., within the same IC package), and/or the memory may be external memory to the processor 314 and functionally coupled over a data bus 324.

The case 300 may include an optional user interface 312 which provides any suitable interface systems, such as a microphone/speaker 334, user input devices 336, and display 338. The microphone/speaker 334 may be utilized for voice communication services using the wireless transceiver 302. In some examples, the head-mounted device 112 may include one or more speakers of its own, but due to the compact form factor of the head-mounted device 112 may include limited low-frequency audio response. Thus, in some aspects, the speaker 334 of case 300 may be configured to supplement the audio provided by the head-mounted device 112, such as by operating as a subwoofer for the head-mounted device 112. The user input devices 336 comprises any suitable buttons for user input. The display 338 comprises any suitable display, such as, for example, a backlit LCD or LED display, and may further include a touch screen display for additional user input modes. In one example, microphone/speaker 334, user input devices 336, and display 338 correspond to the speaker 226, user input devices 228, and electronic display 224, respectively of FIG. 2C. In some examples, user input received via the user input devices 228 may be utilized to trigger at least one camera of the head-mounted device 112 to capture a video or a photo. For instance, user input indicating that a user has pressed a button may be transmitted by the wireless transceiver 302 over a wireless communications link to the head-mounted device 112, where the head-mounted device 112 then initiates the capturing of a photo or video.

FIG. 3A also illustrates case 300 as including a power supply 317 coupled to an electrical connector 319. In some examples, electrical connector 319 is a possible implementation of electrical connector 214 of FIG. 2A. The power supply 317 may include one or more internal batteries as well as a regulator for regulating and/or converting the power from the internal batteries to be provided to the head-mounted device 112 via the electrical connector 319. In some implementations, control unit 310 is configured to detect when head-mounted device 112 is connected via the electrical connector 319 and to initiate the charging of the head-mounted device 112 by power supply 317 in response thereto. In some implementations, the electrical connector 319 may also be configured to transfer data to, and receive data from, the head-mounted device 112 for the establishment of a wired communications link between the case 300 and the head-mounted device 112. Furthermore, the power supply 317 may be coupled to the array 222 of FIG. 2B to receive power generated by the array 222 and to charge the internal batteries of the case 300 and/or to supplement the power provided to the head-mounted device 112.

Control unit 310 may further include a calibration module 326, a location module 328, a local database 329, an image management module 330, and an application module 332. In some implementations, one or more of the calibration module 326, the location module 328, the image management module 330, and the application module 332 may be implemented in hardware 316, firmware 318, processor 314 in combination with software 322, or any combination thereof. For a hardware implementation, the respective module may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof.

Furthermore, processor 314, calibration module 326, location module 328, local database 329, image management module 330, and application module 332 are illustrated separately for clarity, but may be a single unit and/or implemented in the processor 314 based on instructions in the software 322 which are executed in the processor 314. The term processor describes the functions implemented by the system rather than specific hardware. Moreover, as used herein the term "memory" refers to any type of computer storage medium, including long term, short term, or other memory associated with case 300, and is not to be limited to any particular type of memory or number of memories, or type of media upon which memory is stored.

As discussed above, with reference to FIG. 2A, in some implementations a calibration surface 216 may be included on one or more walls of the case, which is then captured by a camera 113D of the head-mounted device 112. In some examples, the calibration module 326 may then receive the captured image of the calibration surface via a communication link established between the head-mounted device 112 and case 300 (e.g., via a wireless communications link established by way of wireless transceiver 302 and/or a wired communications link established by way of electrical connector 319).

The calibration module 326 may be configured to analyze one or more images of the calibration surface, as captured by the head-mounted device 112, and determine calibration data for the calibration of one or more cameras of the head-mounted device 112. In some examples, analyzing the captured images includes detecting one or more of the registration features 218 and determining their relative positions. The calibration module 326 may then transfer the calibration data to head-mounted device 112 for the calibration of subsequent image acquisition by the head-mounted device 112.

The location module 328 may be configured to determine one or more geolocations of the case 300 based on information obtained from wireless transceiver 302, camera 304, motion sensor 306, and/or SPS transceiver 308 utilizing one or more positioning techniques. For example, location module 328 may be configured to determine a geolocation of the case 300 based on SPS measurements of SPS signals acquired by SPS transceiver 308. The local database 329 may be configured to store and update one or more entries, where the entries indicate the geolocation of the case 300 corresponding to when a communication link was established with the head-mounted device 112. Accordingly, in some implementations, case 300 may be configured to provide location services indicating a current or last known location of the head-mounted device 112. For example, in some aspects, case 300 may receive a request for a location of the head-mounted device 112. The request may be received from one or more servers, such as servers 140, 155, 150, via an external network, such as network 130 of FIG. 1. In response to receiving the request, the location module 328 may retrieve a geolocation from the local database 329 that corresponds to a location of the case 300 when a communications link was last established with the head-mounted device 112. The retrieved geolocation may then be transmitted via the wireless transceiver 302 to the external network in response to the request.

The image management module 330 may be configured to receive images, video, or other media captured by the head-mounted device 112 and to store them in memory 320 and/or to initiate their transfer to an external network (e.g., servers 140, 150, or 155 via network 130 of FIG. 1).

Figure 3B:
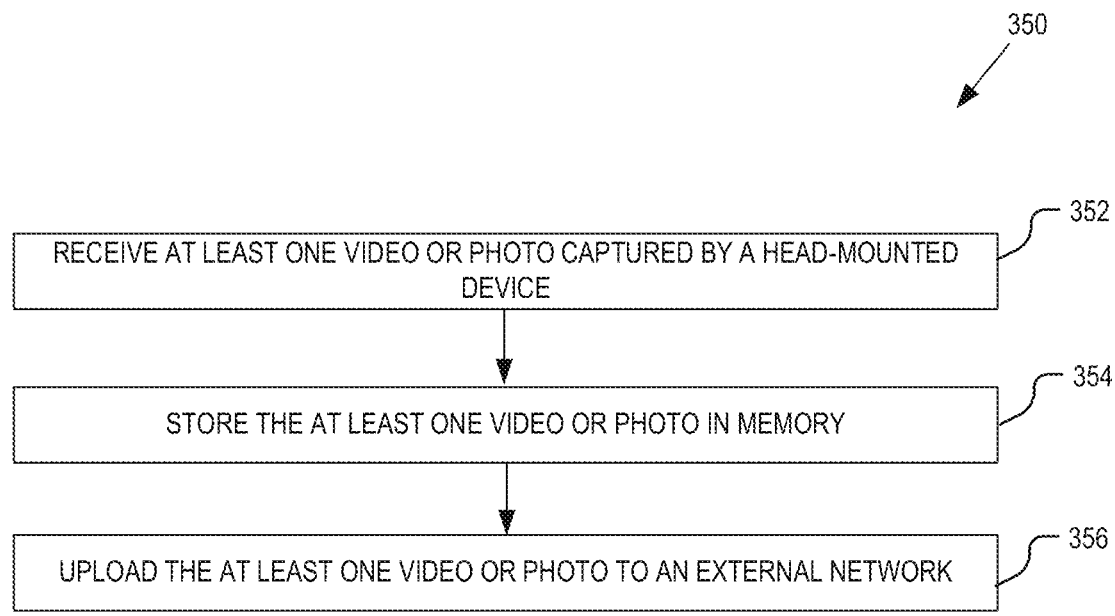
FIG. 3B is a flow chart illustrating an example process performed by a case for a head-mounted device, in accordance with aspects of the present disclosure.

As mentioned above, head-mounted device 112 may include limited resources, such as limited memory and/or limited available wireless bandwidth. Accordingly, image management module 330 may be configured to offload images, video, or other media that are captured by the head-mounted device 112. The image management module 330 may receive the media via a wireless communications link (e.g., by way of wireless transceiver 302) and/or via a wired communications link (e.g., by way of electrical connector 319). In some implementations, the image management module 330 stores the received media in memory 320. In another implementation, the image management module 330 may initiate the transfer of the received media to an external network (e.g., network 130 of FIG. 1). Thus, in some aspects, case 300 may function as a gateway between the head-mounted device 112 and an external network, which may obviate the need for another intermediary device, such as a mobile phone. For example, FIG. 3B is a flow chart illustrating an example process 350 performed by a case, such as case 300. In a process block 352, the case 300 receives at least one video, photo, or audio that was captured by the head-mounted device 112. In some examples, case 300 is configured to receive the media by way of a wireless communications link via wireless transceiver 302. In other examples, case 300 may receive the media by way of a wired communications link via electrical connector 319. Next, in process block 354, the case 300 stores the video, photo, or audio to memory 320. In a process block 356, the case 300 then uploads the video, photo, or audio to an external network, such as network 130 of FIG. 1. In some examples, uploading to the external network is accomplished via wireless transceiver 302 and a corresponding wireless communications link such as communications link 123 or 125 of FIG. 1.

In some aspects, the image management module 330 is configured to receive geolocation data from the location module 328 and to append the geolocation data to the images or video as meta data. The additional meta data may be utilized, in some implementations, for the categorization and/or storing of videos and photos.

In some examples, the wireless transceiver 302 may be configured to receive the media (e.g., photo and/or video) from the head-mounted device 112 via a first radio access technology (RAT), such as Bluetooth, or other WPAN technology. The wireless transceiver 302 may then upload the media to an external network via a second RAT, such as Wi-Fi, or other WLAN technology.

In some examples, the image management module 330 may be configured to perform one or more image processing operations on the photos or videos prior to uploading to the external network. For example, the image management module 330 may apply one or more compression algorithms to the images to reduce the required bandwidth. In another example, the image management module 330 may present the media to the user via the display 338 for preview. In some aspects, the image management module 330 may receive user input via the user input devices 336 allowing the user to modify the media. For example, modifying the media may include deleting, tagging, selecting, and/or editing the media based on the user input.

The application module 332 may be a process or an application running on the processor 314 of the case 300. Applications typically run within an upper layer of the software architectures, and may include a setup application, a software update application, and so on. The setup application may be a process to aid the user in setting up the head-mounted device 112. For example, the setup application may present directions and/or a user interface via display 338, allowing the user to set user preferences and/or configure the head-mounted device 112. In another example, a software update application may be configured to receive one or more software updates from an external network (e.g., network 130) and store the software update in memory 320. Once a communications link is established with the head-mounted device 112, the software update application may transfer the software update to the head-mounted device 112 (e.g., via a wired communications link by way of electrical connector 319 and/or via a wireless communications link by way of wireless transceiver 302).

Any non-transitory computer-readable medium tangibly embodying instructions may be used in implementing the processes or functions described herein. For example, program code may be stored in memory 320 and executed by the processor 314. If implemented in firmware 318 and/or processor 314 with software 322, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 4:
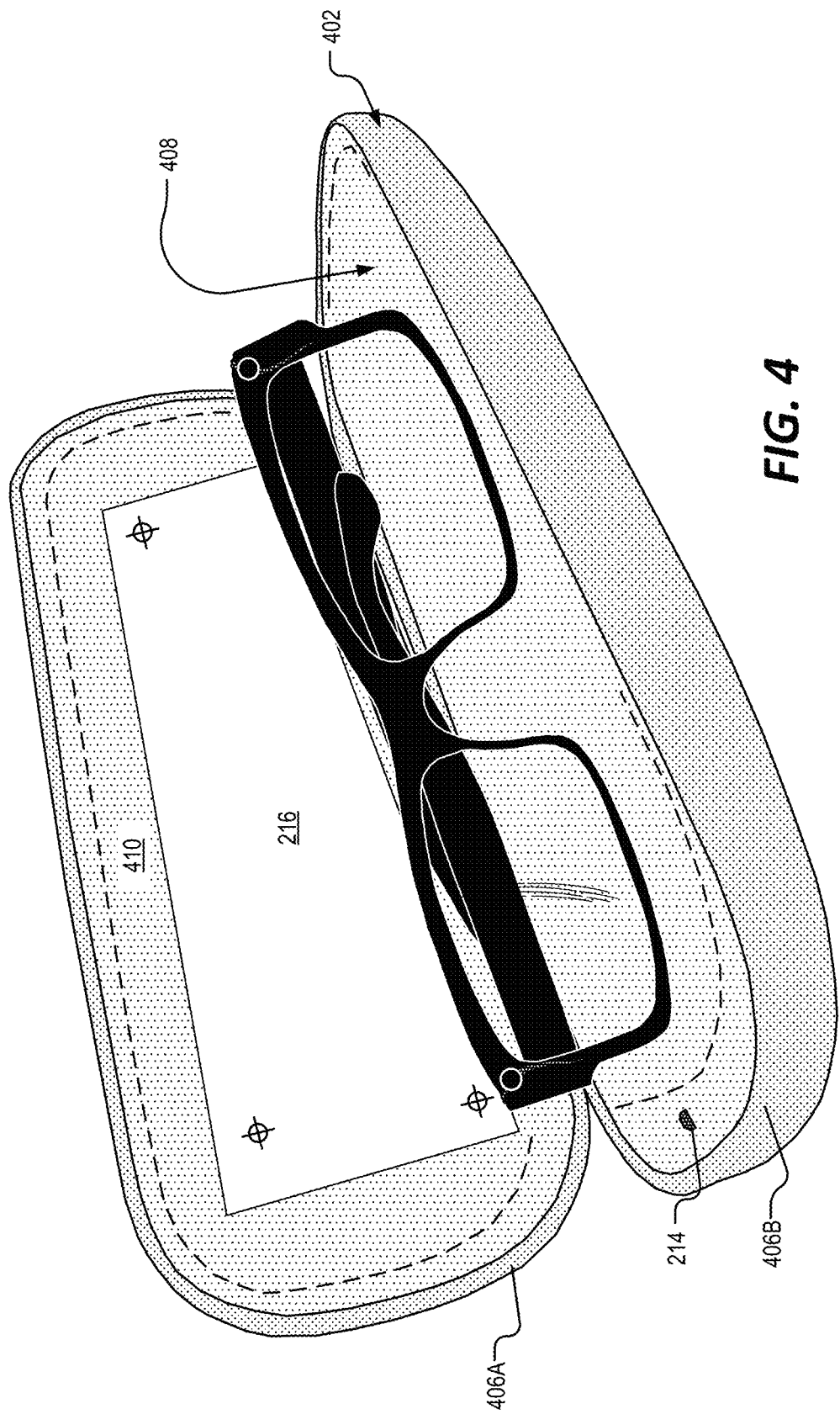
FIG. 4 illustrates an alternative form factor for a case, in accordance with aspects of the present disclosure.

The above example of FIGS. 2A-2D illustrate a particular form factor for case 202. In particular, case 202 is shown as having a body portion 204 that includes four walls 206A-206D, which may be foldable into the arrangement shown in FIG. 2D. However, aspects of the present disclosure are not necessarily limited to the particular form factor of case 202. That is, a case, in accordance with aspects herein, may be configured in a variety of form factors other than those shown in FIGS. 2A-2D. For example, FIG. 4 illustrates an alternative form factor for a case 402, in accordance with aspects of the present disclosure. In the illustrated example, case 402 in configured as a clam-shell case having a first wall 406A and a second wall 406B, which together define an interior cavity 408. In some examples, case 402 may include a power supply (not explicitly shown in FIG. 4) and the electrical connector 214. Case 402 is also shown as including the calibration surface 216 disposed on the interior surface 410 of the wall 406A. Case 402 may also include one or more of the components of case 300 shown in FIG. 3A.

Figure 5:
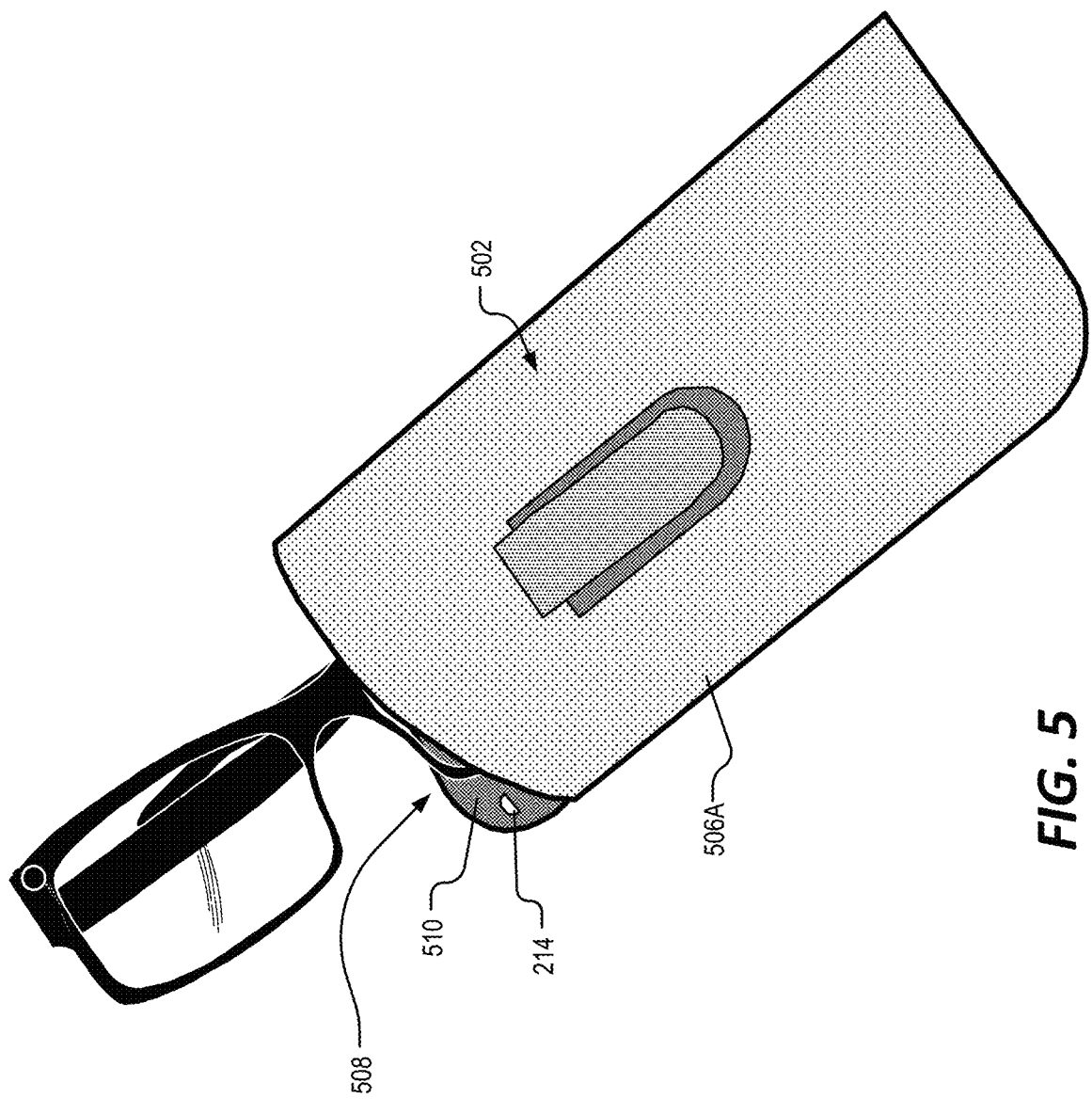
FIG. 5 illustrates another example alternative form factor for a case, in accordance with aspects of the present disclosure.

FIG. 5 illustrates another example alternative form factor for a case 502, in accordance with aspects of the present disclosure. In the illustrated example, case 502 in configured as a pouch or sleeve case having a wall 506A that defines an interior cavity 508. In some examples, case 502 may include a power supply (not explicitly shown in FIG. 5) and the electrical connector 214. Case 502 may also include the calibration surface 216 disposed on the interior surface 510 of the wall 506A (calibration surface 216 not explicitly shown in the current view of FIG. 5). Case 502 may also include one or more of the components of case 300 shown in FIG. 3A.

In addition, a case for a head-mounted device, in accordance with the aspects described herein, may also be configured to support the charging of one or more other electronic devices, other than just the head-mounted device. For example, in some implementations, the form factor of a case may be configured, such that a smart watch may be wrapped, affixed, or secured to an exterior of the case to charge the smart watch with the included power supply of the case (e.g., power supply 212). In another example, the interior cavity (e.g., interior cavity 208) may be configured to receive and house the smart watch in addition to the head-mounted device.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A case for head-mounted glasses, comprising:
a body portion having one or more walls defining an interior cavity that is configured to carry the head-mounted glasses, wherein the interior cavity is configured with a size that enables at least partial operation of one or more cameras of the head-mounted glasses from within the interior cavity, wherein the body portion is configured to receive the head-mounted glasses into the interior cavity, wherein the body portion is configured to support the head-mounted glasses being removable from the interior cavity;
a power supply included in the body portion for transferring power to the head-mounted glasses; and
a calibration surface included in at least one wall of the one or more walls and positioned within the interior cavity to face the one or more cameras of the head-mounted glasses while the head-mounted glasses are positioned within the interior cavity, wherein the one or more cameras are disposed in a frame of the head-mounted glasses.

2. The case of claim 1, wherein the calibration surface is configured to be imaged by the one or more cameras to support calibrated subsequent image acquisition by the head-mounted glasses.

3. The case of claim 2, wherein the calibration surface comprises a calibration image adhered to or formed on an interior surface of the one or more walls.

4. The case of claim 2, wherein the calibration surface comprises one or more illumination sources.

5. The case of claim 4, wherein the one or more illumination sources comprise a backlight for illuminating the calibration surface.

6. The case of claim 4, wherein the one or more illumination sources comprise a light pipe for forming a calibration image.

7. The case of claim 1, further comprising:
at least one processor; and
at least one memory coupled to the at least one processor, the at least one processor and the at least one memory being configured to direct the case to:
receive at least one video or photo captured by the head-mounted glasses; and
store the at least one video or photo in the at least one memory.

8. The case of claim 7, further comprising an electrical connector included in the one or more walls, wherein the at least one memory and the at least one processor are configured to receive the at least one video or photo from the head-mounted glasses via the electrical connector.

9. The case of claim 7, further comprising:
a wireless transceiver coupled to the at least one processor, wherein the wireless transceiver is configured to receive the at least one video or photo from the head-mounted glasses via a first radio access technology (RAT) and to upload the at least one video or photo to an external network via a second RAT.

10. The case of claim 7, wherein the at least one memory and the at least one processor are configured to perform one or more image processing operations on the at least one video or photo.

11. The case of claim 7, further comprising:
one or more user input devices coupled to the at least one processor, wherein the at least one memory and the at least one processor are configured to modify the at least one video or photo in response to user input received via the one or more user input devices.

12. The case of claim 7, further comprising:
an electronic display disposed on an exterior surface of the body portion, wherein the electronic display is configured to present the at least one video or photo.

13. The case of claim 1, further comprising:
a wireless transceiver configured to establish a first wireless communications link with the head-mounted glasses and a second wireless communications link with an external network, wherein the case is configured as a hub for enabling communication between the head-mounted glasses and the external network.

14. The case of claim 1, further comprising:
a wireless transceiver configured to establish a wireless communications link with the head-mounted glasses; and
a motion sensor coupled to the wireless transceiver and configured to generate motion data that is representative of one or more movements of the case, wherein the wireless transceiver is configured to transmit the motion data to the head-mounted glasses via the wireless communications link for remote control of the head-mounted glasses.

15. The case of claim 10, further comprising:
a wireless transceiver configured to establish a wireless communications link with the head-mounted glasses; and
one or more user input devices coupled to the wireless transceiver, wherein the wireless transceiver is configured to transmit user input received via the one or more user input devices to the head-mounted glasses via the wireless communications link to trigger at least one camera of the head-mounted glasses to capture a video or photo.

16. A system comprising:
head-mounted glasses that include one or more cameras positioned in a frame of the head-mounted glasses; and
a portable case for carrying and physically protecting the head-mounted glasses, wherein the portable case includes:
a body portion having one or more walls defining an interior cavity that is configured to carry the head-mounted glasses, wherein the head-mounted glasses are at least partially operable in the interior cavity of the body portion, wherein the head-mounted glasses are removable from the interior cavity of the body portion;
a power supply included in the body portion for transferring power to the head-mounted glasses;
an electronic display disposed on an exterior surface of the body portion, wherein the electronic display is configured to present at least one video or photo captured by the one or more cameras; and
a calibration surface included in at least one wall of the one or more walls and positioned within the interior cavity to face the one or more cameras of the head-mounted glasses while the head-mounted glasses is are positioned within the interior cavity.

17. The system of claim 16, wherein the calibration surface is configured to be captured by the one or more cameras to support calibrated subsequent image acquisition by the head-mounted glasses.

18. The system of claim 16, wherein the portable case further comprises:
a wireless transceiver included in the body portion, wherein the wireless transceiver is configured to establish a wireless communications link with the head-mounted glasses.

19. A system comprising:
head-mounted glasses that includes:
a frame;
one or more temple arms;
one or more near-eye optical elements; and
one or more cameras; and
a portable case for carrying and physically protecting the head-mounted glasses, wherein the portable case includes:
a body portion having one or more walls defining an interior cavity that is configured to carry the head-mounted glasses, wherein the head-mounted glasses are at least partially operable in the interior cavity of the body portion, wherein the head-mounted glasses are removable from the interior cavity of the body portion; and
a calibration surface included in at least one wall of the one or more walls and positioned within the interior cavity to face the one or more cameras that are positioned in the frame of the head-mounted glasses while the head-mounted glasses are positioned within the interior cavity of the portable case.

20. The system of claim 19 wherein the head-mounted glasses further comprising:
at least one processor; and
at least one memory coupled to the at least one processor, wherein the at least one processor and the at least one memory being configured to:
receive at least one video or photo captured by the one or more cameras; and
store the at least one video or photo in the at least one memory.

* * * * *